(12) United States Patent
Rouibia et al.

(10) Patent No.: US 10,601,910 B2
(45) Date of Patent: Mar. 24, 2020

(54) METHOD FOR BROADCASTING A PIECE OF CONTENT IN AN IT NETWORK

(71) Applicant: EASYBROADCAST, Saint Sebastien sur Loire (FR)

(72) Inventors: Soufiane Rouibia, Nantes (FR); Bastien Casalta, Nantes (FR)

(73) Assignee: EASYBROADCAST, Saint Sebastien sur Loire (FR)

( * ) Notice: Subject to any disclaimer, the term of this patent is extended or adjusted under 35 U.S.C. 154(b) by 332 days.

(21) Appl. No.: 14/390,958

(22) PCT Filed: Apr. 4, 2013

(86) PCT No.: PCT/IB2013/052694
§ 371 (c)(1),
(2) Date: Oct. 6, 2014

(87) PCT Pub. No.: WO2013/150478
PCT Pub. Date: Oct. 10, 2013

(65) Prior Publication Data
US 2015/0058420 A1    Feb. 26, 2015

(30) Foreign Application Priority Data
Apr. 5, 2012   (FR) ...................... 12 53152

(51) Int. Cl.
*H04L 29/08*   (2006.01)
*H04L 12/26*   (2006.01)

(52) U.S. Cl.
CPC .......... *H04L 67/104* (2013.01); *H04L 43/08* (2013.01); *H04L 43/0876* (2013.01);
(Continued)

(58) Field of Classification Search
CPC ............... H04L 67/104; H04L 67/1063; H04L 67/1091; H04L 67/02; H04L 67/108;
(Continued)

(56) References Cited

U.S. PATENT DOCUMENTS 7,657,648 B2 * 2/2010 Xiong ................... H04L 12/185
                                                      709/230
8,051,194 B2 * 11/2011 Luzzatti ................ H04L 67/104
                                                      709/217

(Continued)

FOREIGN PATENT DOCUMENTS

EP    2 109 289 A1   10/2009
GB    2 412 279 A    9/2005

OTHER PUBLICATIONS

Written Opinion of the International Searching Authority issued in International Application No. PCT/IB2013/052694 dated Aug. 20, 2013.

(Continued)

*Primary Examiner* — Patrice L Winder
*Assistant Examiner* — Angela M Widhalm De Rodrig
(74) *Attorney, Agent, or Firm* — Oliff PLC

(57) ABSTRACT

A method for broadcasting a piece of content in an IT network including a content server having the content to be broadcast, and a plurality of clients seeking to retrieve the content, method in which the content is served in client/server mode to at least one client in a format allowing the subsequent broadcasting of same in P2P mode.

11 Claims, 3 Drawing Sheets

Figure 1:
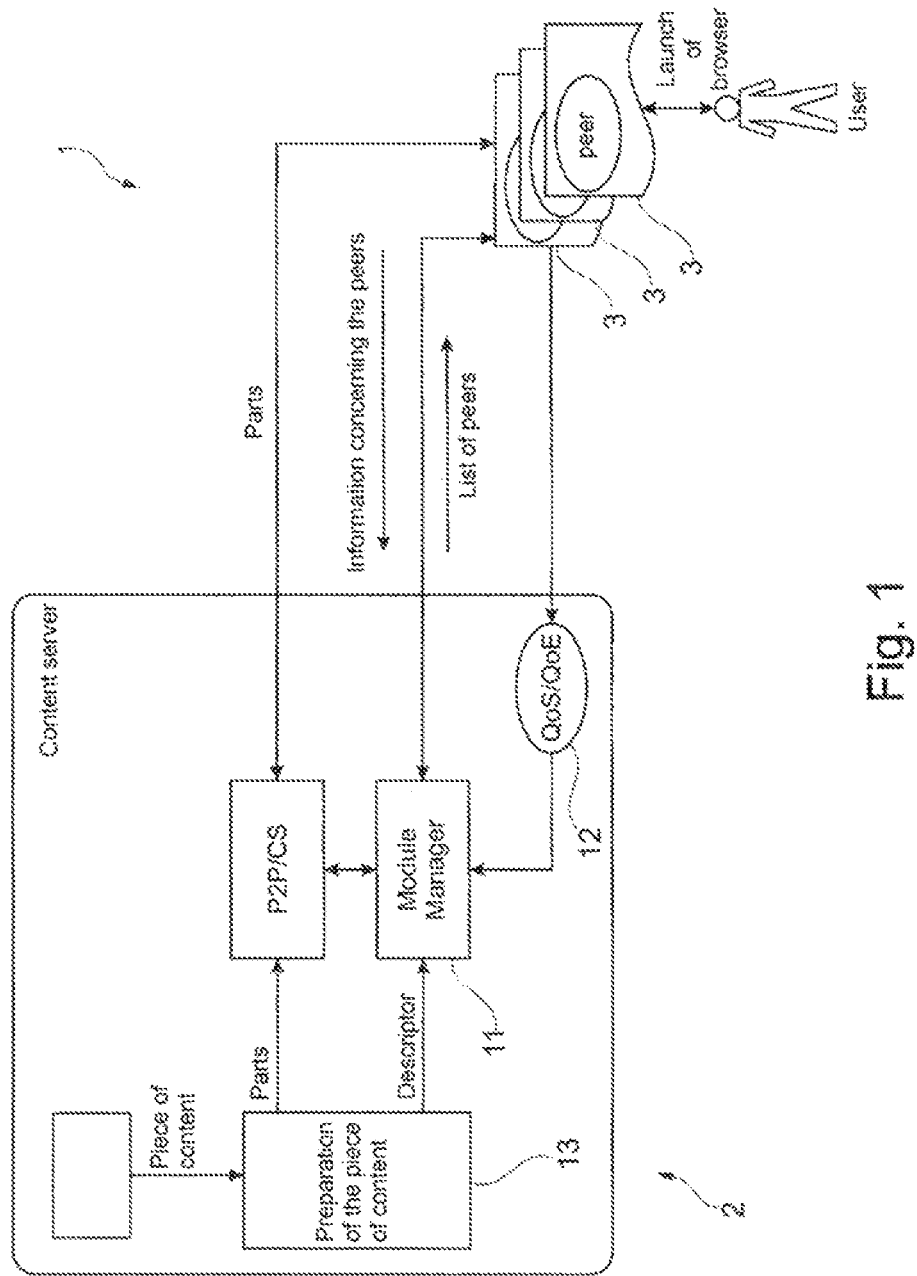

(52) U.S. Cl.
CPC .............. *H04L 43/16* (2013.01); *H04L 67/02* (2013.01); *H04L 67/108* (2013.01); *H04L 67/1063* (2013.01); *H04L 67/1091* (2013.01); *H04L 67/34* (2013.01)

(58) Field of Classification Search
CPC ..... H04L 67/34; H04L 43/08; H04L 43/0876; H04L 43/16
See application file for complete search history.

(56) References Cited

U.S. PATENT DOCUMENTS

| | | | | |
|---|---|---|---|---|
| 8,204,791 | B2* | 6/2012 | Chavez | G06Q 30/0283 705/1.1 |
| 8,493,902 | B2* | 7/2013 | Suri | H04L 67/104 370/312 |
| 8,924,460 | B2* | 12/2014 | Collet | H04L 67/104 709/202 |
| 9,154,552 | B2* | 10/2015 | Hickmott | H04L 67/104 |
| 9,237,101 | B2* | 1/2016 | Chen | H04L 1/004 |
| 2005/0203851 | A1* | 9/2005 | King | H04L 63/10 705/51 |
| 2008/0133538 | A1* | 6/2008 | Chavez | H04L 67/104 |
| 2008/0133767 | A1* | 6/2008 | Birrer | H04L 65/4076 709/231 |
| 2008/0205291 | A1* | 8/2008 | Li | H04L 12/5695 370/254 |
| 2009/0006538 | A1* | 1/2009 | Risney, Jr. | G06F 8/61 709/203 |
| 2009/0092124 | A1* | 4/2009 | Singhal | H04L 67/104 370/351 |
| 2009/0238182 | A1* | 9/2009 | Yanagihara | H04L 12/1854 370/390 |
| 2009/0282160 | A1* | 11/2009 | Wang | H04L 12/18 709/231 |
| 2010/0145771 | A1* | 6/2010 | Fligler | G06Q 10/10 705/319 |
| 2010/0235432 | A1* | 9/2010 | Trojer | H04L 12/2861 709/203 |
| 2011/0173305 | A1* | 7/2011 | Matuszewski | H04L 45/02 709/221 |
| 2011/0191418 | A1* | 8/2011 | Yang | H04N 21/47202 709/204 |
| 2012/0309425 | A1* | 12/2012 | El Khayat | H04L 67/18 455/456.3 |
| 2013/0031211 | A1* | 1/2013 | Johnson | H04N 21/23103 709/218 |

OTHER PUBLICATIONS

International Search Report issued in International Application No. PCT/IB2013/052694 dated Aug. 20, 2013.

* cited by examiner

METHOD FOR BROADCASTING A PIECE OF CONTENT IN AN IT NETWORK

The present invention relates to the broadcasting of a piece of content within an IT network, and more particularly but not exclusively to the broadcasting of a piece of content on the Web.

From the patent application EP 2 109 289 it is known to have a system for broadcasting a piece of content wherein a user, who has said piece of content, sends it to other users in a peer-to-peer exchange mode (P2P), using a database including information concerning the users. The piece of content to be broadcast is not stored in the broadcasting system.

Networks for P2P broadcasting of a piece of content are known, particularly from the patent application US 2008/0205291.

With the exception of instant, messaging, services, "chat" and some P2P software programs, most Internet applications are based on a conventional client/server model. The client/server architecture relies on a central terminal, the server, which sends the data to client machines.

Patent application GB 2 412 279 describes a broadcasting method wherein a piece of content can be alternatively broadcast in client/server mode, from a central server to a user, or in P2P mode, from one user acting as server to another user.

Several limits of web functionality have begun to appear following the advent of high-speed connections and the tremendous increase in the size of the content (HD video, high-resolution images etc.) conveyed over the Internet.

Although web applications have considerably evolved by making the most of user experience and community aspects, the client/server paradigm still imposes technical and functional limitations at the user level on this evolution.

The operating cost of a web application constitutes one of these limitations. Generally, the development cost of an Internet service is relatively low. However, the operating cost, which is primarily linked to bandwidth and storage space, is quite high, meaning that less can be offered to users. For example, providing royalty-free media (photo, audio, video) involves continuous investment which is difficult to recoup.

Also, currently, the interruption of a connection with the server entails the simple cessation of the service provided.

The alternative used to deal with problems of server saturation in the event of a heavy influx of Internet users to an Internet site consists in resorting to the services of companies offering CDNs (Content Delivery Networks). This solution has a very high cost for the content provider and requires permanent monitoring of the servers in case of network overloading in order to increase the bandwidth and the size of the servers. Such a solution is suitable for improving the reliability of the piece of content for average levels of demand but is still unable to meet the challenges of very high levels of demand or live transmission. This is due to the problem of audience peaks and their regulation, which requires abundant bandwidth and hardware adapted according to the size of the peak.

There is therefore a need to further improve the broadcasting of a piece of content within an IT network and more particularly on the Web, and especially to eliminate network congestion problems permanently and more cheaply.

The invention manages to do this using a method for broadcasting a piece of content in an IT network including a content server having the piece of content to be broadcast and a plurality of clients seeking to retrieve said piece of content, a method wherein the piece of content is served in client/server mode to at least one client in a format allowing its subsequent broadcasting in P2P mode to other clients.

The content may in particular be served in client/server mode to the first clients seeking to retrieve it, then the server may broadcast this content in P2P mode to the following clients, while keeping a client/server mode with said first clients.

The invention makes it possible to combine the peer-to-peer paradigm with the conventional client/server model of web applications to profit from the advantages of these two architectures.

The invention offers a solution based on a P2P technology adapted to a Web environment and coupled with a classic client/server operation. This hybrid solution may be integrated, especially in the form of a plug-in, into all Web browsers and makes it possible to distribute multimedia pieces of content while reducing the infrastructure and bandwidth costs for content providers, while preserving the same quality of service for the internet user.

The invention makes it possible to speed up and facilitate access to certain services in great demand, especially during particular events (sporting events, festivities etc.) or information posted in the form of multimedia content, for example documents or videos of over 30 Mo posted on news sites.

The invention concerns any type of content, for example a live video, retrievable or viewable on the Web via a browser.

The invention allows the resources particularly storage space and bandwidth, of the internet user to be involved to a relatively small extent. The storage space invested by the internet user can not exceed the cache already used by the web applications.

The operating cost of the invention is low due to the fact that it benefits from the very nature of the P2P architecture. Indeed, content providers may offload the majority of the processing of the services onto their final users and be limited, once the download has been started, to acting as a directory while offering more attractive services to their internet users. The invention makes it possible for the continuity of the service to be ensured by the number of internet users sharing the same content.

The invention allows large and small content providers to offer their internet users a Quality of Service (QoS) equivalent to, or even greater than, a CDN, and at a lower cost.

The content server may list the clients that have already retrieved part of the piece of content and address to a new client seeking to retrieve the piece of content the address of at least one other client from which it can retrieve at least one part of this piece of content.

The content server can advantageously determine the part or parts most often missing in the swarm, and the content server can address to a new client at least one of the parts identified as most often missing in order to ease its integration into the swarm and to allow faster broadcasting of the pans than in a conventional P2P broadcasting system.

The piece of content may be sent by the content server in the form of parts identified with an associated item of information aiming to ease the exchange between clients in P2P mode. The associated item of information preferably includes the hash.

A module for monitoring the quality of service is advantageously used to retrieve at least one quality of service parameter from the clients.

The number of authorized client/server connections, i.e. the maximum number of connections before the server switches to P2P mode, is preferably a function of said at least one parameter.

The number of connections authorized between the Internet users may be limited if the connection of the internet user transmitting the content is not valid, in order to limit the use of its bandwidth.

The method may include the provision by the content server to a client of a program to be installed especially in the form of a plug-in on the browser of this client, to be able to retrieve the piece of content in client/server mode with a P2P format and to receive the list of the clients of the content server.

The method may include the determination of the mode of broadcasting of the piece of content in real time, client/server or P2P, as a function of predefined thresholds, particularly QoS and QoE, of the clients retrieving the piece of content.

The method may enable the broadcasting of the piece of content, in P2P mode, via the browsers of the clients.

Another subject of the invention, according, to another of its aspects, is a computer program product, including a computer program stored on a medium or downloaded, arranged, onto the computer of a client, to:

install on the computer an application that makes it possible, from the browser of the client, upon connection to a content server arranged for implementing the method according to the invention, to:

download the content from the server in client/server mode by parts compatible with its broadcast in P2P mode to other clients that have connected to the content server or, if the server does not offer this possibility, download from the server a list of clients having parts of the content so as to retrieve it in a P2P mode from other clients that have connected to the content server.

When the content server receives a new connection request, the content server determines if the client has a program making it possible to implement the invention. If not, the content server offers to the client the downloading of a program in the form of a plug-in ensuring protocol compatibility. If the client does have a program, the content server updates the thresholds and determines whether the thresholds have been exceeded and if the client must be served in P2P mode or in client/server mode. If the thresholds of the number of connections have not been exceeded, the piece of content can be transmitted in client/server mode. The content server lists the numbers of the client that will be served in client/server mode. The piece of content is sent in small parts and in http client/server mode. If the thresholds have been exceeded, the client will be served in P2P mode.

The content server lists the numbers of the client and sends it the numbers of the clients, in particular the IP address and port, and at least one of the parts.

During execution, after a content request to the server, the program retrieves the downloading mode from the content server. In the case where the server indicates to the program that the content can be retrieved in client/server mode, the latter is retrieved in the form of parts from the content server. In the case of P2P mode, the program retrieves the list of the clients, especially with their numbers, and at least one part of the piece of content, preferably at least one of the most often missing. The program then connects to the swarm and retrieves the piece of content. The piece of content retrieved in parts is reconstructed by the program with a view to reading and/or displaying it.

The program may moreover retrieve information concerning the piece of content, such as for example the hash of the piece of content, the size of the piece of content or that of the parts, if the piece of content is small in size, for example below 50 Mo, the program may retrieve the hashes of the parts. If the piece of content is large in size, for example above 50 Mo, upon receiving each pan the client may request its hash from the server in order to check its authenticity. The security of the piece of content is thus ensured by the centralization at server level of the broadcasting of the hashes of the parts.

Figure 2:
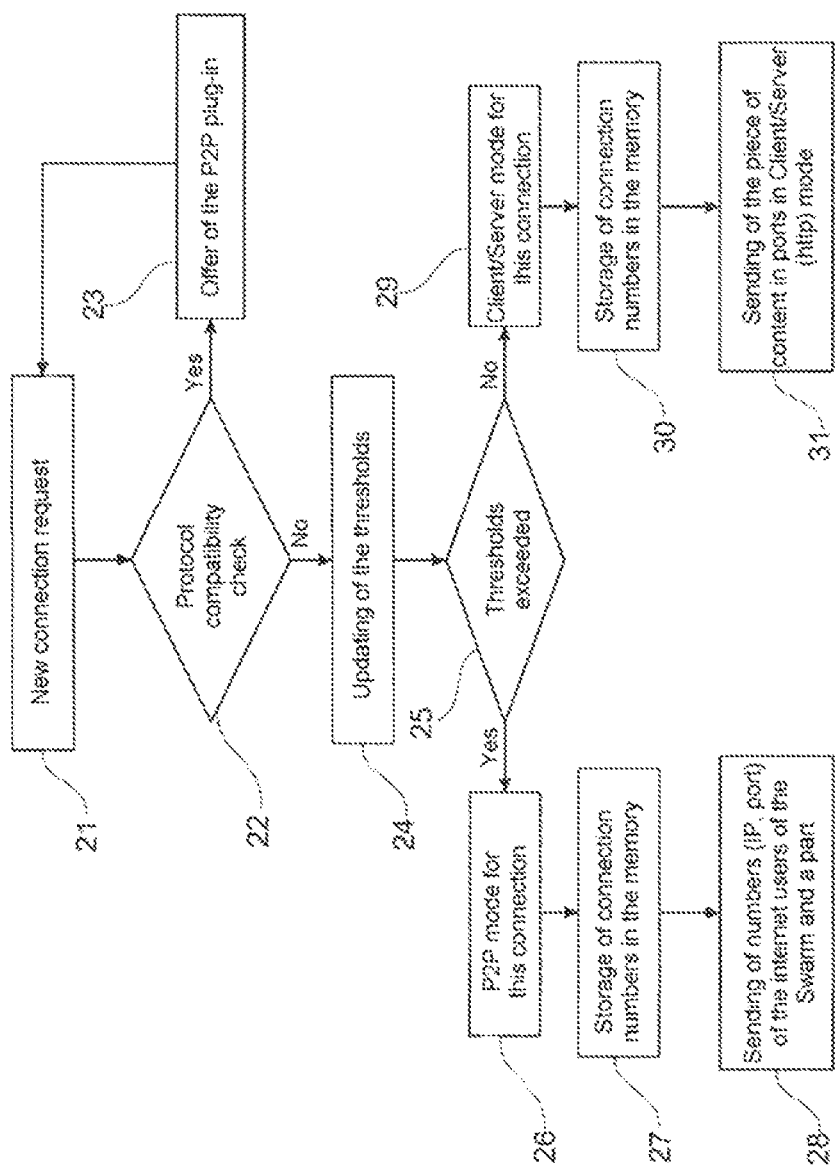
Figure 3:
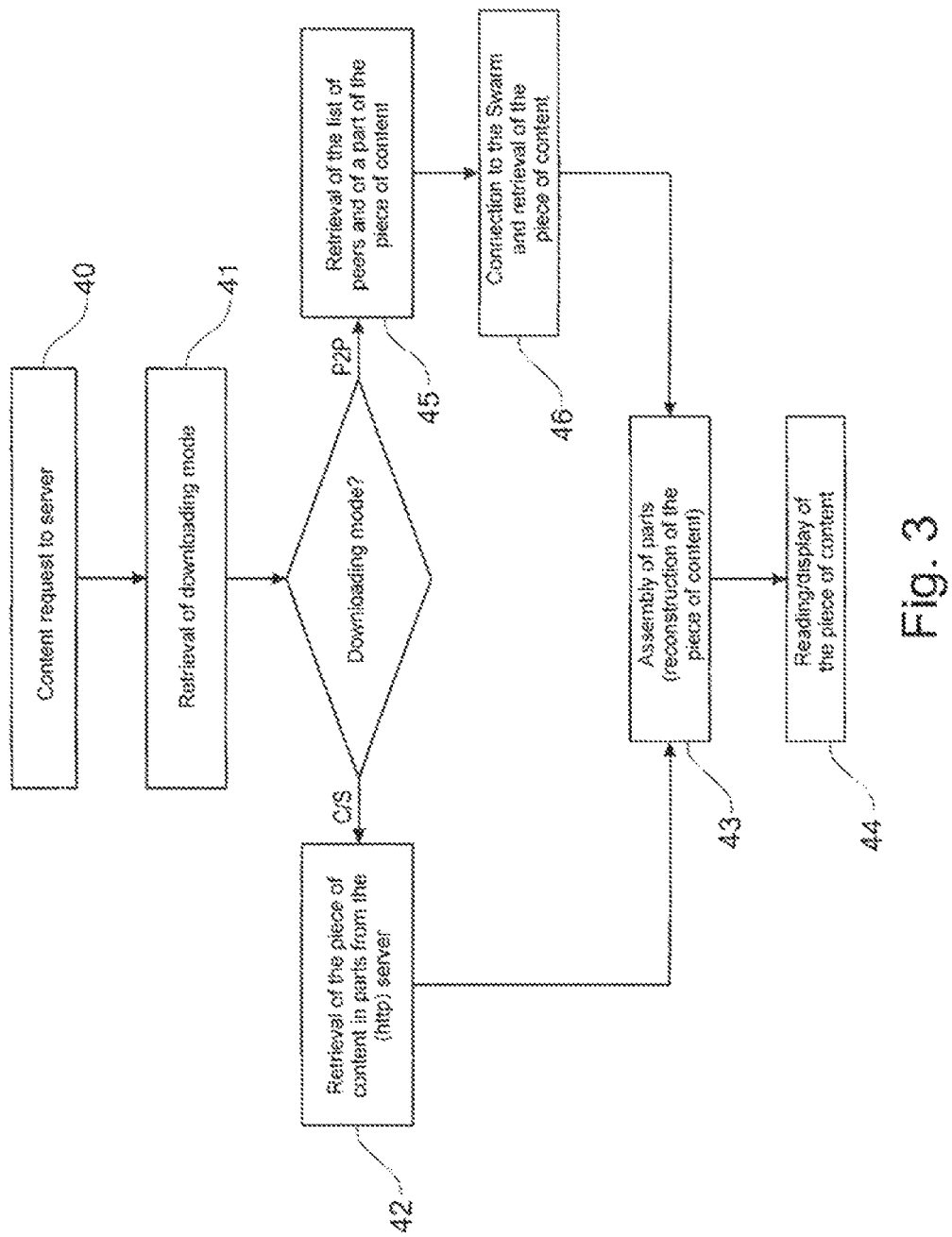

The invention may be better understood upon reading the following detailed description, of an exemplary implementation not limiting the latter, and upon examining the appended drawing, wherein:

FIG. 1 schematically illustrates an architecture allowing the implementation of the invention, FIG. 2 schematically represents a task diagram of the module manager, and FIG. 3 schematically represents a task diagram of the plug-in module of the browser.

The method according to the invention may be implemented within a global architecture 1, schematically represented in FIG. 1, including a content server 2 and several clients 3 consisting in this example of internet users who communicate with the content server by way of the Internet network.

Unlike a pure P2P operation, the piece of content to be broadcast is always present on the content server 2.

During, the implementation of the method, the server 2 begins to serve the first internet user clients, also called peers, in client/server mode.

To ease the switch to P2P mode, the server 2 divides the piece of content into small parts (from 65 Ko to 1 Mo depending on the size and type of the piece of content) and identifies each part of the piece of content.

For example, the N−1 first internet users are served in client/server mode but the piece of content is sent in small parts with information on each of these parts, such as number and identifier, the latter preferably including the hash.

The client/server mode thus uses the division of the piece of content into small parts and the identification of each part to ease the change to P2P as well as to secure the piece of content in both client/server and P2P modes.

Starting for example from the Nth interim user and/or the crossing of one or more predefined thresholds, for example relating to the bandwidth or to the CPU load, the server 2 sends to the Nth, newly connected, internet user a list of internet users who have already retrieved part of the piece of content so that the Nth internet user can begin to retrieve the piece of content in P2P mode from the internet users listed by the list. The Nth Internet user may be the $100^{th}$ or the $200^{th}$ user or more depending on the power of the server and the Quality of Service (QoS) and Quality of Experience (QoE) parameters returned by the various internet users.

Among the information uploaded to the server by the internet users, in addition to the QoS and QoE parameters, each client sends information on the most recent part that it has downloaded and indicates the level of download reached. This information allows the server 2 to know the parts most often missing in the "swarm", i.e. here the set of cheats that are consulting the server 2.

One of the great problems of P2P protocols is the slowness of integration of the new arrival into the swarm. The new arrival has nothing to offer because it has no part and no client in the swarm will be interested in it except those which have already downloaded everything and which are called "seeds".

If there are not many seeds, the new client will take several minutes to be integrated into the swarm.

To solve this problem, in addition to the list of the clients and the information on the piece of content, the server 2 also sends to the new arrival at least one of the parts most often missing in the swarm to allow the new client to rapidly integrate the swarm and begin the exchanges with the other clients.

All the functionalities of the P2P exchange, such as the exchange of the client list between internet users, in particular PEX[2] Peer Exchange, and the retrieval of the client list via means other than the content server, particularly DHT[3] Distributed Hash Table, can be used in the invention.

The content server 2 includes modules known as module manager 11, quality of service monitoring module 12 and content preparation module 13.

Module Manager

The module manager 11 chooses, according to limits set by the quality of service module 12, the mode of communication: client/server or P2P. The various tasks of the module manager 11 are shown in FIG. 2.

Upon a new connection request by an internet user, in step 21, the module manager determines in step 22 whether the internet user has the program suitable for receiving the content. If not, it allows the internet user to download the program in the form of a plug-in in step 23. If the internet user does have the program, in step 24 the module manager updates the thresholds that determine the operating mode, client/server or P2P. In step 25, the module manager determines whether the thresholds have been exceeded.

If so, in step 26 the internet user is led to download the piece of content in P2P mode and in step 27 the module manager stores the numbers of the internet user, then in step 28 sends to the interact user the IP and port numbers of the internet users of the swarm as well as one of the parts, particularly a part that is being sought as indicated above.

If the thresholds have not been exceeded, in step 29 the module manager allows the internet user to download in client/server mode, stores its numbers in a memory in step 30 and sends the piece of content to the internet user in the form of parts in step 31, as explained previously.

Quality Monitoring Module

The module 12 retrieves all the Quality parameters, particularly quality of service QoS and quality of experience QoE, as well as protocol parameters such as bandwidth and download speed, associated with each piece of content, and transmitted by all the internet user clients. On the basis of these parameters, the module 12 updates the thresholds, especially the limit of the number of connections authorized in client/server mode and the maximum bandwidth per connection, and determines the parts that are most often missing in the swarm.

The parameters and the thresholds may change according to the content exchanged in the swarm. In particular, the criteria and the quality thresholds of a piece of video content are not the same as for a static web page.

Content Preparation Module

Module 13 divides the piece of content to be broadcast into small parts that may be transported in each of the client/server or P2P modes of communication and computes an identifier for each of the parts, preferably the hash.

The size of the parts depends primarily on the type of content (streaming or live video, static content etc.) and on its size. For streaming and live video, the size of the parts will also depend on the encoding used on the piece of content. In this case (streaming or live) the size of the parts can vary from 125 Ko to 500 Ko. For static content the size may vary from 65 Ko to 1 Mo.

The program installed in the form of a plug-in on the client browser allows the browser to retrieve the piece of content in client/server mode with the P2P format, in the form of parts with their associated information (number of the parts, their sizes and their identifiers).

FIG. 3 illustrates the operation of this program.

In step 40, the internee user has connected to the content server 2.

In step 41 the program retrieves the downloading mode from the content server.

In the case where the downloading mode is the client/server mode, in step 42 the program retrieves the content directly from the server, in the form of parts, as indicated above, which are then assembled in step 43 to reconstruct the piece of content, and to allow its use for example by reading or display, in step 44.

In the case where the downloading mode is the P2P mode, in step 45 the program retrieves the peer list and one part of the piece of content, preferably the most often sought piece, as explained previously, in order to integrate into the swarm in step 46 to retrieve the other parts of the piece of content.

Next, the reconstruction of the piece of content can take place in step 43, and its use in step 44.

The invention is not limited to the examples that have just been described.

The expression "including" should be understood as being a synonym of "including at least one".

The invention claimed is:

1. A method for broadcasting a piece of content in an Information Technology (IT) network including a content server having the piece of content to be broadcast, and a plurality of clients seeking to retrieve the piece of content, the method comprising:

transmitting, by the content server, the piece of content in a client-server mode to at least one client of the plurality of clients in a format that allows subsequent broadcast of the piece of content in a peer-to-peer (P2P) mode, the piece of content being addressed by the content server in the form of parts each uniquely identified with an associated identifier;

transmitting, by each of the plurality of clients to the content server, information on a most recent part that the respective client has downloaded and information indicating the level of download reached;

determining, by the content server, based on the information on the most recent part and the information indicating the level of download reached for each of the plurality of clients, a part or parts most often missing in a swarm of the plurality of clients;

transmitting, by the content server to a new client seeking to join the swarm to retrieve the piece of content, at least one of the parts identified as most often missing in the swarm;

the mode of broadcasting the piece of content in real time, as client-server or P2P, being determined as a function of one or more predefined thresholds including a limit of a number of connections of the clients with the content server, wherein:

upon a connection request to the content server by the new client that is ahead provided with a program for receiving the piece of content, the one or more predefined thresholds are updated by the content server and the content server determines whether the limit of the number of connections of the clients with the content server has been exceeded, if the limit of the number of connections of the clients with the content server has not been exceeded, the piece of content is transmitted by the content server to the new client in client-server mode, and if the limit of the number of connections of the clients with the content server has been exceeded, the new client is served in P2P mode.

2. The method as claimed in claim 1, wherein the content server generates a list of the clients that have already retrieved one part of the piece of content, and addresses, to the new client seeking to retrieve the piece of content, an address of at least one other client from the list from which the client can retrieve at least the one part of the piece of content.

3. The method as claimed in claim 1, wherein the content server includes an associated item of information for the associated identifier, the associated item of information including a hash.

4. The method as claimed in claim 1, further comprising monitoring a quality of service based on at least one quality of service parameter retrieved from the clients.

5. The method as claimed in claim 4, wherein the number of authorized client/server connections is a function of the at least one quality of service parameter.

6. The method as claimed in claim 1, further comprising:
providing to a client, by the content server, a program in the form of a plug-in that is installed in the browser of the client, wherein the program is configured to retrieve the piece of content in client-server mode with a P2P format and to receive a list of the clients of the content server.

7. The method as claimed in claim 1, wherein the broadcasting of the piece of content is allowed, in P2P mode, via browsers of the clients.

8. A non-transitory computer readable medium comprising computer program instructions that, when executed by a processor, cause the processor to:

transmit a piece of content in a client-server mode to at least one client of a plurality of clients in a format that allows subsequent broadcast of the piece of content in a peer-to-peer (P2P) mode, the piece of content being addressed by a content server in the form of parts each uniquely identified with an associated identifier;

receive, from each of the plurality of clients, information on a most recent part that the respective client has downloaded and information indicating the level of download reached;

determine based on the information on the most recent part and the information indicating the level of download reached for each of the plurality of clients, a part or parts most often missing in a swarm of the plurality of clients;

transmit, to a new client seeking to join the swarm to retrieve the piece of content, at least one of the parts identified as most often missing in the swarm the mode of broadcasting the piece of content in real time, as client-server or P2P, being determined, as a function of one or more predefined thresholds including a limit of a number of connections of the clients with the content server, wherein:

upon a connection request to the content server by the new client that is already provided with a program for receiving the piece of content, the one or more predefined thresholds are updated by the content server and the Content server determines whether the limit of the number of connections of the clients with the content server has been exceeded, if the limit of the number of connections of the clients with the content server has not been exceeded, the piece of content is transmitted by the server to the new client in client-server mode, and if the limit of the number of connections of the clients with the content server has been exceeded, the new client is served in P2P mode.

9. The method as claimed in claim 1, wherein the content server lists the IP address and port of the client that will be served in client-server mode, and the piece of content is sent in small parts and in Hypertext Transfer Protocol client-server mode.

10. The method as claimed in claim 1, wherein the content server comprises a module manager which determines the mode of broadcasting the piece of content in real time, client-server or P2P.

11. The method as claimed in claim 1, wherein upon a connection request by the new client, if the new client does not have a program suitable for receiving the content, the new client is allowed to download a program in the form of a plug-in ensuring protocol compatibility.

* * * * *